United States Patent [19]
Benedict

[11] 4,231,581
[45] Nov. 4, 1980

[54] PNEUMATIC HAMMER WITH TWIST RETAINER

[75] Inventor: Neil W. Benedict, Evanston, Ill.

[73] Assignee: Ajax Tool Works, Inc., Franklin Park, Ill.

[21] Appl. No.: 949,408

[22] Filed: Oct. 10, 1978

[51] Int. Cl.³ ............................................. B23B 31/22
[52] U.S. Cl. ..................................... 279/19.4; 279/75; 279/81; 403/357
[58] Field of Search ...................... 279/19.4, 19.5, 72, 279/1 Q, 81; 285/91; 403/357

[56] References Cited
U.S. PATENT DOCUMENTS

| | | | |
|---|---|---|---|
| 1,888,685 | 11/1932 | Norling | 279/81 X |
| 2,470,385 | 5/1949 | Wenger | 279/19.4 X |
| 3,466,772 | 9/1969 | Phillips | 403/357 X |
| 4,002,348 | 1/1977 | Johnson | 279/81 X |

Primary Examiner—Z. R. Bilinsky
Attorney, Agent, or Firm—Fitch, Even, Tobin, Flannery & Welsh

[57] ABSTRACT

A pneumatic hammer is provided with a quick-change retainer which may be twisted between an open position in which a tool may be inserted or removed and a closed position in which the tool is locked within the retainer. A compressible lock rod is provided to hold the retainer in at least the closed position and preferably the open position also. A stop means limits the twisting movement at the open and closed positions.

4 Claims, 13 Drawing Figures

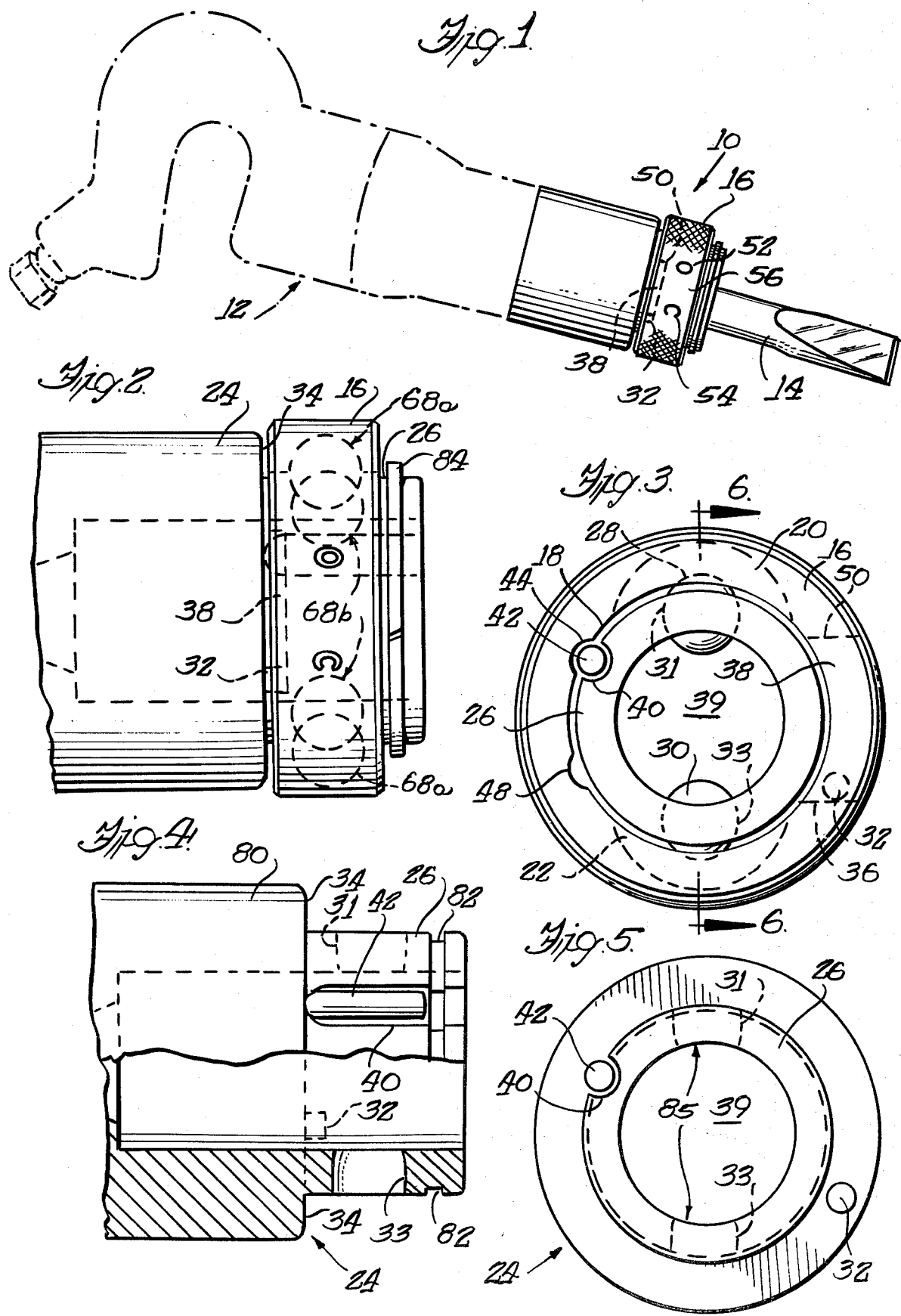

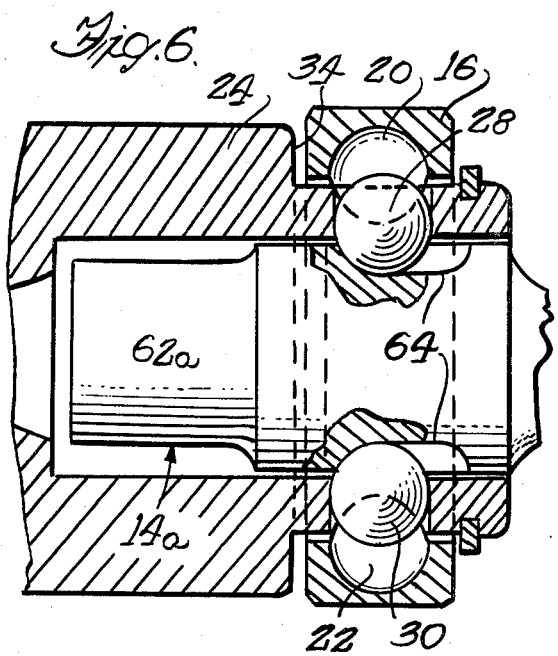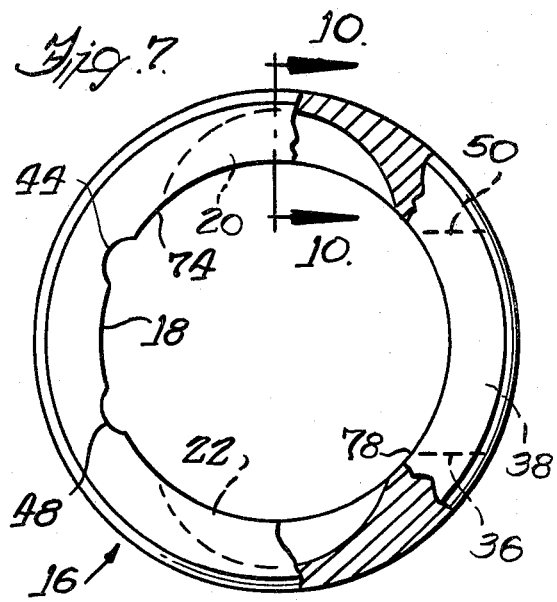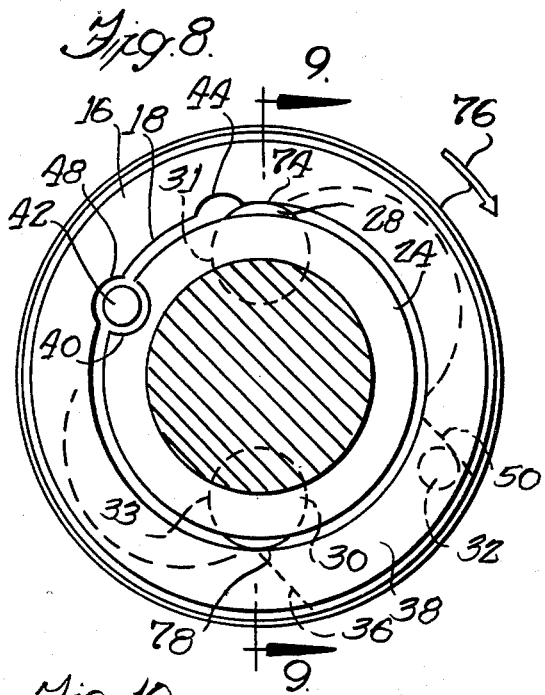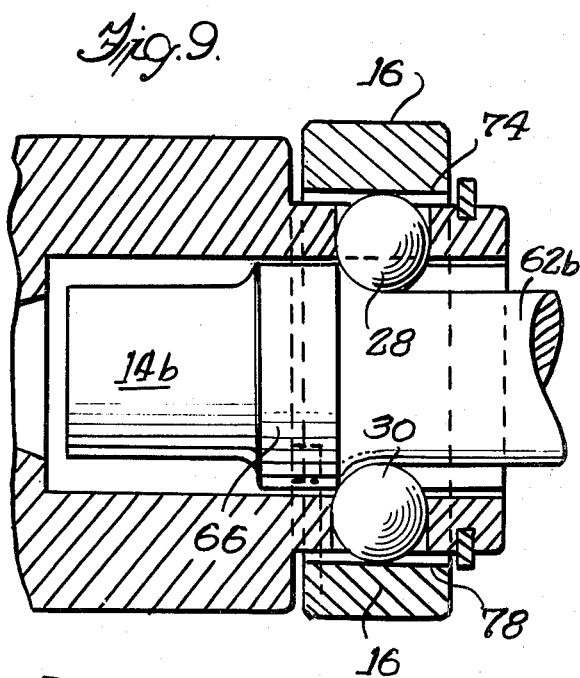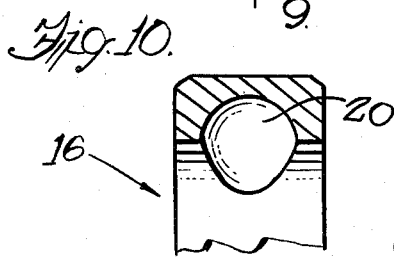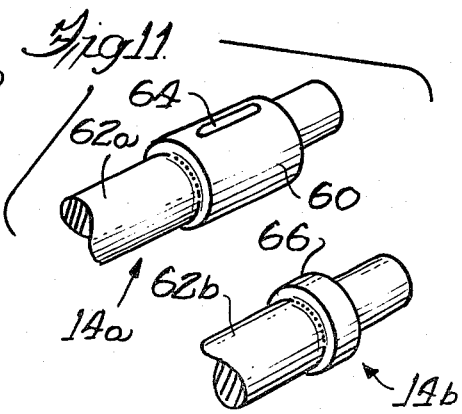

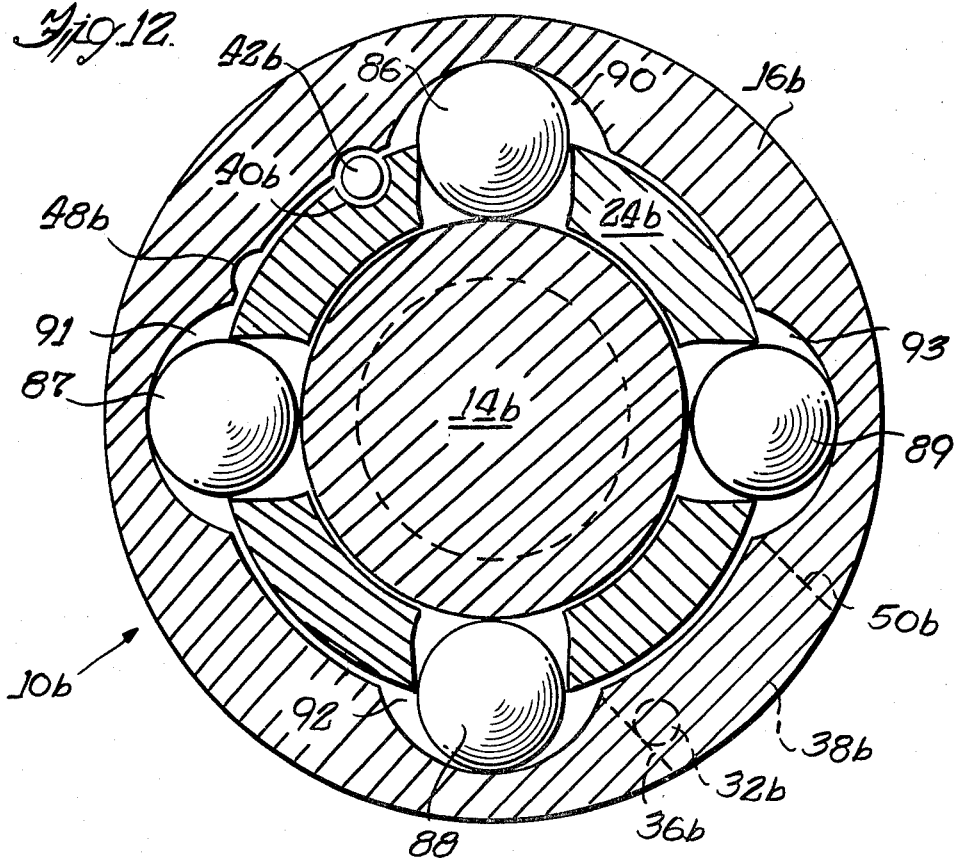
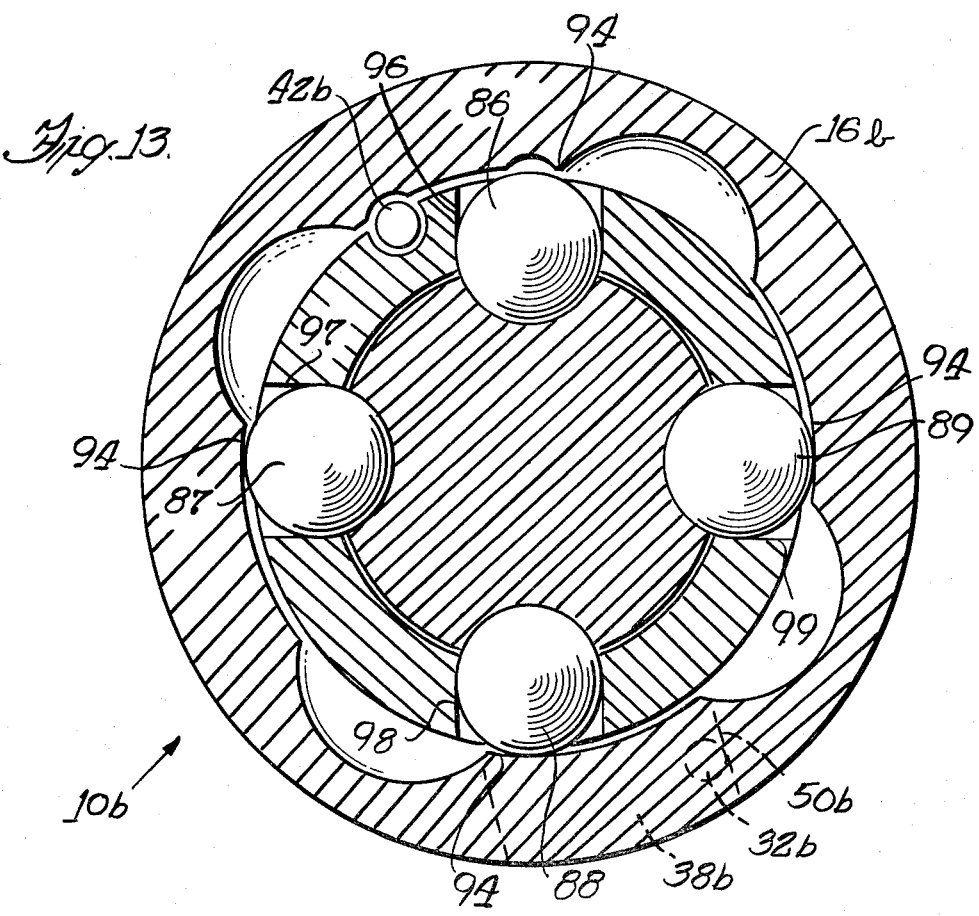

PNEUMATIC HAMMER WITH TWIST RETAINER

This invention relates to percussive tools such as chipping hammers and more particularly to hammers having quick-change retainers.

More specifically, the present invention is directed to a hammer having as an integral portion thereof a quick-change retainer of the kind in which one or more retaining balls are mounted in sockets in a barrel of the hammer for releasable locking cooperation with a tool shank inserted into a tool receiving bore in the barrel rather than a separate detachable quick-change retainer. A retaining sleeve is rotatably or slidably mounted on the barrel for moving between a locking or closed position for holding the balls in a radially inward position in which the axial extent of movement of the tool under the striking force of the internal piston of the chipping hammer is limited and a release or open position in which the balls are free to shift radially outwardly in the barrel and allow the tool to move there past.

Retainer devices have been provided with a detent for holding the sleeve relative to the barrel in a position corresponding to an open or closed retainer. For instance, the inner surface of the retaining sleeve may have one or more channels on the inside surface spaced to correspond to the open or closed positions. The outer surface of the barrel carries a compressible rod which, when aligned with one of the channels of the sleeve, expands into that channel to "hold" the sleeve relative to the barrel.

However, due to the resilient nature of these compressible rods, it is possible when twisting the sleeve to the closed position to "overshoot" the closed position making it difficult to quickly find the closed or locked position. Furthermore, since the plastic rod may become somewhat deformed due to repeated compressions, the detent may lose the feel of solid engagement at the point of alignment. Thus, with the passage of time, it could become increasingly difficult to determine the actual closed or open positions.

Accordingly, it is an object of the present invention, to provide a pneumatic hammer with a quick-change retainer obviating, for practical purposes, the above-mentioned limitations, particularly in a manner requiring a relatively simple mechanical arrangement.

These and other objects and advantages of the invention will become apparent from the following detailed description taken in connection with the accompanying drawings in which:

FIG. 1 is a perspective view of a quick-change retainer for a pneumatic hammer embodying features of the present invention;

FIG. 2 is an enlarged fragmentary view of the retainer shown in FIG. 1 without a tool and with portions of the retainer shown in phantom illustrating alternative positions;

FIG. 3 is a front view of the retainer shown in FIG. 2 and illustrating one of the alternative positions;

FIG. 4 is a side view of the barrel of the retainer of FIG. 2 with portions shown in phantom;

FIG. 5 is a front view of the barrel of FIG. 4;

FIG. 6 is a partial cross-sectional view along the line 6—6 of FIG. 3, shown with a tool;

FIG. 7 is a front view of a retainer sleeve;

FIG. 8 is a front view of the retainer of FIG. 6 with the tool shown in cross-section;

FIG. 9 is a partial cross-sectional view of the retainer of FIG. 8 along the line 9—9;

FIG. 10 is a fragmentary cross-sectional view of the sleeve of FIG. 7 along the line 10—10;

FIG. 11 is a fragmentary view of the shank portions of two alternative types of tools;

FIG. 12 is a partial cross-sectional view of an alternative embodiment of the retainer of FIG. 1;

FIG. 13 is a partial cross-sectional view of the retainer of FIG. 12 but shown in an alternative position.

As shown in the drawings for the purposes of illustration, the present invention is embodied in hammer 12 having a quick-change retainer 10 which holds a tool 14 for reciprocation by the hammer. More specifically, as best seen in FIGS. 2 and 3, the retainer 10 includes an outer cylindrical sleeve 16 which has an internal bore opening or surface 18 in which are a plurality of generally elliptically shaped recesses, for example, recesses 20 and 22. The hammer 12 has a barrel 24 having a generally cylindrical portion 26 on which the retainer sleeve 16 is rotatably carried and which has a central bore opening which admits the shank of the tool 14. The recesses 20 and 22 of the sleeve 16 are of a sufficient size to allow a pair of retaining balls 28 and 30 to move therein when the sleeve is rotatably turned or twisted in a counter-clockwise direction to an aligned position at which a pin 32 carried on a shoulder 34 of the barrel 24, abuts an end wall 36 of a slot 38 in the sleeve 16. This position will hereinafter be referred to as the "open" position since, as best seen in FIG. 3, the balls 28 and 30 are free to move radially outward into the recesses 20 and 22, respectively, to allow the insertion or removal of a tool 14 into or from the central bore 39.

A detent is provided to hold the retainer in the open position. Accordingly, the cylindrical portion 26 of the barrel 24 has a groove 40 which carries a plastic lock rod 42 which may be made of nylon, for example. The sleeve 16 also has a groove 44 which, when the pin 32 abuts the end wall 36, the groove 44 is aligned with the groove 40 of the barrel allowing the lock rod 42 to expand and occupy the groove 44 to hold the barrel 24 and sleeve 16 in the open position.

When the inner surface 18 of the retainer sleeve 16 is turned to align a second groove 48 therein with the lock rod 42, the sleeve is held in a "closed" or locked position (which will be more fully explained later). The slot 38 in the sleeve 16 extends circumferentially from the end wall 36 for approximately 50° to a second end wall 50 so as to allow the retainer sleeve 16 to be twisted only between positions at which the nylon lock rod 32 is aligned and expanded into one of the grooves 44 and 48 of the sleeve 16. When the nylon rod 42 is in one of the grooves 44 or 48, the sleeve will have been moved to a limit position, which is either an open or closed position, as indicated by an "O" indicia 52 (corresponding to the open position) and a "C" indicia 54 (corresponding to the closed position) stamped on a face 56 which has been cleared from the knurled surface 58 of the retainer sleeve 16.

As previously mentioned, when the retainer 10 is in the open position, the shank of a tool 14 may be inserted into the central bore opening 39 of the barrel 24. The tools 14 may have various kinds of shanks such as, for example, as shown in FIG. 11. A tool 14a is shown to have an enlarged cylindrical portion 60, carried on the shank portion 62a, in which are formed a pair of longitudinal grooves 64, which when the balls 28 and 30 are inserted the grooves 64 hold the tool against turning. A tool 14b is shown to have an enlarged collar 66 carried on the shank portion 62b, the collar being abutted by the retaining balls 28 and 30 to hold the tool (FIG. 9) while allowing the same to turn.

When the retainer is in the open position, the insertion of the shank of a tool causes the balls 28 and 30 to move out of the way of the shank and assume the radially outward position 68a shown in FIG. 2. After insertion, the balls 28 and 30 are free to move forward of the collar 66 or into the grooves 64 to assume a radially inward position 68b (FIG. 2). This position is shown in greater detail in FIG. 6 wherein the balls 28 and 30 have moved radially inward towards the grooves 64 of the tool 14a from the recesses 20 and 22 into restraining sockets 31 and 33, respectively, defined by the cylindrical portion 26 of the barrel 24.

As best seen in FIG. 8, the retainer sleeve 16 may be rotated clockwise with respect to the barrel 24 until it is stopped by the pin 32 abutting the end wall 50 of the slot 38. While the sleeve 16 is being twisted, the lock rod 42 is held by the groove 40 of the barrel 24, causing the lock rod 42 to be forced out of the groove 44 of the sleeve 16 and compressed between the barrel 24 and sleeve 16. The lock rod 42 remains compressed until the groove or channel 40 is aligned with the lock rod 42 which expands thereby holding the sleeve 16 relative to the barrel 24 in the closed position. When the groove 48 of the sleeve 16 is aligned with the groove 40 of the barrel 24, the pin 32 engages the end wall 50 which limits the clockwise rotation of the sleeve so that the groove 70 cannot be rotated past the alignment position with the groove 40. This allows the locked or closed position to be readily found which reduces wasted time trying to find the closed position and increases safety since the operator is assured that the tool is locked in and cannot be accidentally expelled.

A portion 74 of the bore surface 18 of the sleeve 16 provides a camming surface to force the ball 28 radially inward into the socket 31. The camming surface 74 engages the ball 28 while the sleeve 16 is being twisted in a clockwise direction (as shown by an arrow 76) which also causes a camming surface 78 to engage the ball 30 and force the ball 33 radially inward into the socket 33 until the balls engage either the sockets 31 and 33 or the tool 14a or 14b. The sleeve 16 may be twisted in a clockwise direction until the pin 32 of the barrel 24 engages the end wall 50 of the sleeve 16 at which time the lock rod 42 expands into the aligned groove 48 and the balls 28 and 30 are held radially inward by the camming surfaces 74 and 78, respectively. This position corresponds to the closed position, as shown in FIG. 9, the balls 28 and 30 are positioned radially inwardly and forward of the collar 66 of the tool 14b which retains or limits the forward travel of the shank 62b. Thus, the tool 14b is locked into the hammer 12. A tool with shank grooves 64 such as illustrated at 14a in FIG. 11 would be locked into the hammer in a similar manner except that the balls 28 and 30 would be urged into the shank grooves 64 instead of forward of a collar 66 and the tool 14b would be held against twisting.

To release the tool, the sleeve 16 need merely be rotated in a counter-clockwise direction until the pin 32 engages the other end wall 36 of the slot 38 which corresponds to the open position. In the open position, the balls are free to move radially outward into the recesses 20 and 22 allowing the shank of the tool to be removed. The pin 32 and the end walls of the slot 38 provide a positive feel to the user of the retainer as to when the retainer is in the open or closed position. The pin 32 and slot 38 stop the sleeve 16 from being overtwisted causing the user to miss the open or closed position and thus being forced to hunt around for these positions.

Turning now to a more detailed description of the illustrated embodiment, the barrel 24 of the illustrated embodiment can be seen more clearly in FIGS. 4 and 5. The cylindrical portion 26 may have, for example, an inner diameter of 0.780 inches to define the central bore 39 and an outer diameter of 1.140 inches. The diametrically opposed sockets 31 and 33 may be formed within the cylindrical portion 26 with a 0.316 inch diameter ball end drill which is not drilled through such that the walls of the socket taper inwardly toward the central bore 39 to an opening 85 having a diameter smaller than the diameter of the balls to limit the extent of inward projection of the balls. The groove 40, in the illustrated embodiment, is cylindrical in cross-section and has a radius of 0.093 inches which carries the lock rod 42 which has a somewhat smaller diameter.

The cylindrical portion 26 is carried by a larger cylindrical portion 80 which has the end wall 34. The cylindrical portion 26 extends approximately 0.687 inches from the end wall 34 and defines a C-ring groove 82 which carries a C-ring 84 (shown in FIG. 2) which prevents the retainer sleeve 16 from sliding off the end of the cylindrical portion 26 of the barrel 24. The retainer sleeve 16 is limited in the other direction by the end wall 34 of the barrel 24 which, together with the C-ring 84, properly positions the sleeve 16 in the axial direction with respect to the barrel 24 so that the retainer sleeve is not displaced due to the jarring impacts during operation of this hammer. The pin 32 carried on the end wall 34 diametrically opposed from the groove 40, has a diameter of about 0.125 inches and extends approximately 5/32 inches from the end wall 34.

Turning now to a more detailed description of the retainer sleeve 16, the retainer sleeve shown in FIGS. 7 and 10 has an inner diameter of 1.175 inches, an outer diameter of 1.625 inches and a width of 0.500 inches. The diametrically opposed recesses 20 and 22 are formed with a radium of 0.046 inches extending in a circumferential direction and centered 0.343 inches from the axial center of the sleeve 16. Each recess has a radius of 0.156 inches in an axial direction illustrated in FIG. 10. The grooves 44 and 48 are formed to radius of 0.093 inches measured from 0.531 inches radially from the center of the sleeve 16. The center of the groove 44 is displaced 65° from the center of the recess 20 with the groove 48 similarly displaced 65° from the center of the recess 22 wherein the grooves 44 and 48 are displaced 50° from each other.

The slot 38 has a depth of 0.062 inches and extends 0.718 inches so that the end wall 36 is diametrically opposed from the groove 44 and the end wall 50 is diametrically opposed from the groove 48. Thus, since the pin 32 is diametrically opposed to the groove 40 of the barrel 24, when the pin 32 engages the end wall 50, the groove 40 of the barrel 24 is aligned with the groove 48 of the sleeve 16 corresponding to the closed position. Similarly, when the pin 32 engages the end wall 36 of the slot 38, the groove 40 of the barrel 24 is aligned with the groove 44 of the sleeve 16 corresponding to the open position as shown in FIG. 3.

An alternative embodiment is shown in FIG. 12 which utilizes 4 balls 86–89. The retainer 10b is shown in the open position wherein the balls 86–89 are free to move up into the recesses 90–93, respectively, which allows the tool 14b to be inserted or withdrawn. In this position, the pin 32b abuts the end wall 36b of the slot 38b. In this embodiment of the invention, the sleeve 16b is not locked in the open position but is merely compressed between the inner wall of the sleeve and the rod's groove in the barrel 24b. The sleeve need not be locked in the open position.

However, the retainer 10b is locked in the closed position when the pin 32b is abutting the end wall 50b of the slot 38b, as best seen in FIG. 13. In this closed position, the rod 42b is aligned with the groove 48b of the sleeve 16b and expands into the groove 48b to hold the retainer sleeve against inadvertent turning toward the open position. The camming surfaces 94 urge the balls 86–89 radially inward into the sockets 96–99 and forward of a collar 66 or into groove 64 of a tool to lock the tool within the retainer 10b. Utilizing four balls as shown in FIG. 13 can provide more uniform radial support to help maintain the tool in axial alignment to prevent the tool from becoming cocked within the retainer.

From the foregoing, it will become apparent that the present invention provides a quick-change retainer which provides a positive engagement delineating open and closed positions in which a tool may be quickly inserted and locked, respectively. The positive engagement provides a positive feel to an operator which can increase the life of a retainer lock rod and further insure the safe operation of the hammer.

While a preferred embodiment has been shown and described, it will be understood that there is no intent to limit the invention by such disclosures, but, rather, it is intended to cover all modifications and alternate construction falling within the spirit and scope of the invention as defined in the appended claims.

What is claimed is:

1. A pneumatic hammer for use with tools having a retainer collar or retaining grooves on a shank of the tool, said pneumatic hammer including:

a barrel, said barrel having a first large diameter portion and a smaller diameter cylindrical portion, a radially extending shoulder wall between said large diameter and smaller cylindrical portions, said barrel having a central bore opening at one end thereof to receive a shank of a tool and a plurality of circumferentially spaced retaining ball sockets in said cylindrical portion;

a plurality of retaining balls each inserted into one of said sockets to project inwardly into the barrel bore;

said sockets having inwardly tapered walls extending toward said bore and opening therein with a dimension smaller than the diameter of said balls in said socket to limit the extent of inward projection of said balls;

an outer retainer sleeve rotatably carried on said cylindrical portion of said barrel, having a plurality of recesses in said retainer sleeve for alignment with said balls at an open position to allow said balls to move radially outward in said sockets to allow insertion or removal of a tool and having a plurality of camming surfaces thereon with each surface being adjacent to a socket for twisting toward a ball to force and hold said ball inwardly at a closed position to retain the shank collar or shank grooves and limit the tool shank to a predetermined outward position;

detent means for locking said sleeve in at least said closed position comprising a resilient compressible rod having one end mounted in said shoulder wall and extending longitudinally along said cylindrical portion, a longitudinally extending groove formed in said sleeve for receiving said rod when said sleeve is in said locking position, said rod being compressible and removed from the groove by twisting said sleeve in order to change the position of said sleeve relative to the barrel; and limiting means associated with said sleeve and barrel for limiting the twisting movement of said sleeve relative to said barrel, said limiting means comprising a pin carried by one of said barrel and sleeve, and first and second abutment means carried by the other of said barrel and sleeve, said first abutment means for stopping said pin when said sleeve is in the open position and said second abutment means for stopping said pin when said sleeve is in the closed position.

2. A pneumatic hammer in accordance with claim 1 in which a longitudinally extending groove is formed in said cylindrical portion and in which said compressible rod extends partially into said groove.

3. A pneumatic hammer in accordance with claim 2 in which said compressible rod is formed of a plastic material.

4. A pneumatic hammer in accordance with claim 1 in which said pin has one end fixed to said shoulder wall and extends longitudinally along said cylindrical portion.

* * * * *